March 5, 1957    R. A. HARRISS    2,783,956
VARIABLE-INCIDENCE SWEPTBACK WING FOR AIRCRAFT
Filed April 29, 1953    3 Sheets-Sheet 1

RICHARD ALAN HARRISS, INVENTOR
By Stevens, Davis, Miller & Mosher
ATTORNEYS

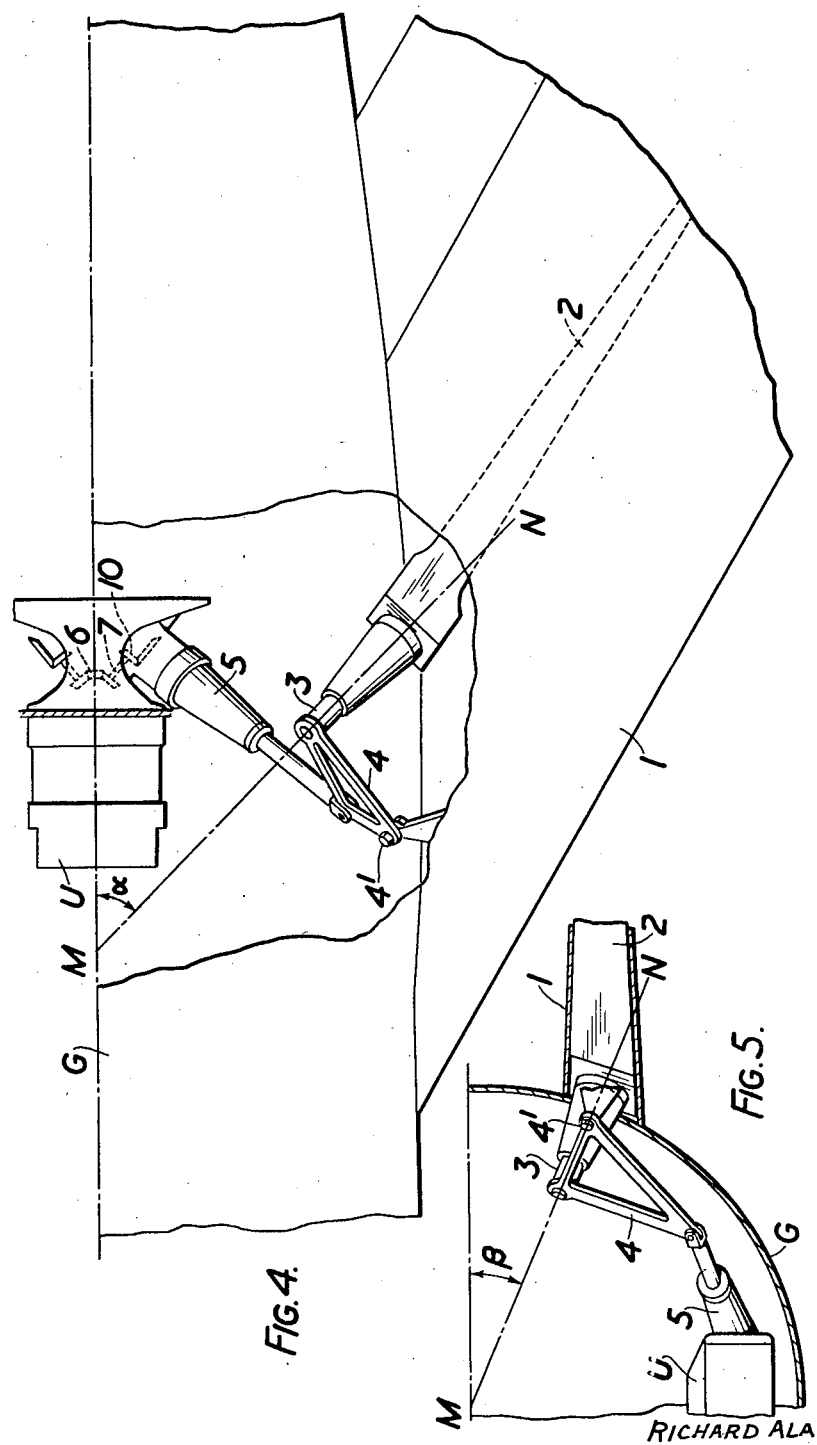

March 5, 1957  R. A. HARRISS  2,783,956
VARIABLE-INCIDENCE SWEPTBACK WING FOR AIRCRAFT
Filed April 29, 1953  3 Sheets-Sheet 3

INVENTOR
RICHARD ALAN HARRISS

By Stevens, Davis, Miller & Mosher
ATTORNEYS

United States Patent Office 2,783,956
Patented Mar. 5, 1957

2,783,956

VARIABLE-INCIDENCE SWEPTBACK WING FOR AIRCRAFT

Richard Alan Harriss, Wharton, England, assignor to The English Electric Company Limited, London, England, a British company Application April 29, 1953, Serial No. 351,791

Claims priority, application Great Britain May 9, 1952

6 Claims. (Cl. 244—48)

The invention relates to lifting surfaces of aircraft for example to the tailplane thereof, of the type having a considerable sweep-back of the leading and of the trailing edges. A considerable sweep-back is one exceeding say 30° from the spanwise direction, and amounting preferably to 45° and more.

On such lifting surfaces the chordwise position of the centroid of pressure is located in the region of the trailing edge of the root section. If such a lifting surface is pivoted about an axis perpendicular to the plane of symmetry passing through the maximum thickness position of the root section for maximum structural efficiency, the moments about this axis would accordingly become very large.

Moreover, when such a swept-back surface pivoted as described hereinabove is rotated relative to a fuselage of circular cross section, gaps would be formed between the fuselage and the leading and trailing edges of the root section.

According to a main feature of the invention the swept-back lifting surfaces are pivoted each about a swept-back axis passing in plan view between the extreme centroid of pressure positions encountered at different Mach numbers, altitudes, and angles of incidence of the said lifting surface whereby the magnitude of the moments about this axis is reduced to a minimum in any condition of flight, and through the root section of said lifting surface adjacent its maximum airfoil thickness, where a structural pivot member of the dimensions required for the very high loads encountered can be accommodated within the airfoil.

Typical values of these extreme centroid of pressure positions are for example 13% of the mean chord at subsonic flight and 28% of the mean chord at supersonic flight.

According to a preferred feature the inclination of this axis in end elevation will depend on the fuselage profile which the root leading edge of the tailplane is to traverse. For example with a low set tailplane this axis has a negative dihedral whereby the leading edge of the root section when tilted downwards follows more closely the contour of a fuselage of circular cross section or any other body tapering towards the rear to which the lifting surface is pivoted. Conversely with a high set tailplane this axis would have positive dihedral. The opposite conditions would apply to a lifting surface fitted to a body tapering forwardly.

In order that the invention may be clearly understood and readily carried into effect the principle of it and an embodiment thereof will now be described with reference to the accompanying drawings in which:

Fig. 4 is a plan view, and Fig. 5 is a front elevation partly in section to Fig. 3.

Referring first to the Figures 1a to 2c, the fore-and-aft direction is the X-axis, the spanwise direction is the Y-axis, and the vertical is the Z-axis. The plane of symmetry is accordingly the plane passing through the X- and Z-axes.

The root section is marked A—B, A being the leading edge and B the trailing edge. The centroid of pressure is marked C. P. $f$ for the forward position and C. P. $a$ for the backward position thereof. The line of maximum profile thickness is marked E—F, E being on the root and F on the tip. The pivot axis of the lifting surface is marked M—N, M lying inboard, and N outboard. The fuselage G has a circular cross section.

Figure 1A:
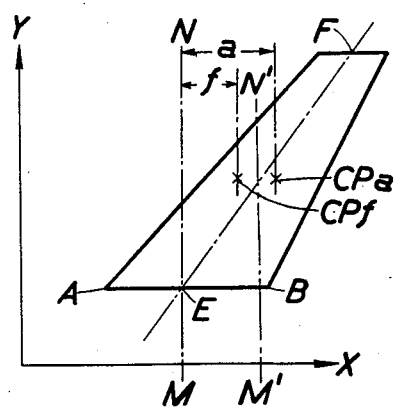
Figs. 1a and 1b are a diagrammatic plan view and frontal elevation, respectively, of a swept-back lifting surface pivoted in the known manner about an axis perpendicular to the plane of symmetry to a fuselage of circular cross section.
Figure 1B:
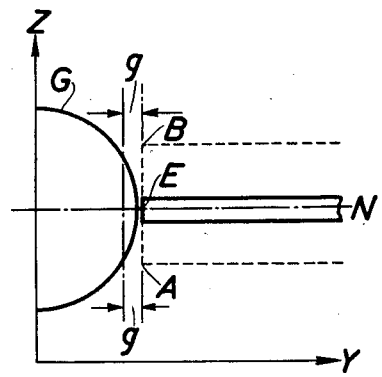

Referring now to Figs. 1a and 1b the pivot axis M—N passes through the position of maximum thickness E of the root section A—B perpendicular to the plane of symmetry X—Z, i. e. parallel to the Y-axis. It will be seen from Fig. 1a that the leverage $a$ or $f$ from the centroid of pressure C. P. $a$ or C. P. $f$, respectively, to the pivot axis M—N is considerable, and that accordingly the moments about this axis are very large. If the pivot axis is placed into the position M'—N' between the extreme centroid of pressure positions C. P. $a$ and C. P. $f$ in order to reduce these leverages, then it passes very near the point B at the very thin trailing edge of the wing root section A—B where there is no possibility of accommodating a structural pivot member of the dimensions required for the very high loads encountered within the airfoil.

In Fig. 1b the lifting surface is shown in full lines in its normal position, and its leading edge and trailing edge are indicated in dotted lines in the downwardly tilted position of the leading edge. It will be seen that gaps $g$ are formed between the leading edge A and trailing edge B of the root section and the circular contour of the fuselage G when the lifting surface is tilted. This is particularly disadvantageous at the leading edge, while the undesirable effects at the trailing edge are less pronounced.

Figure 2A:
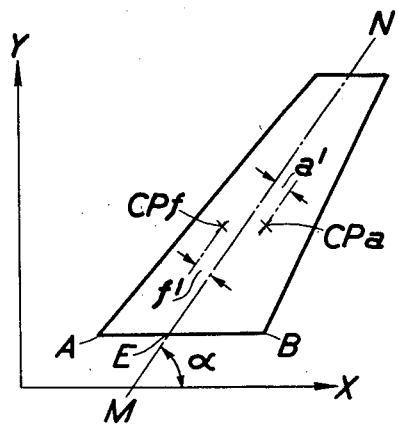
Fig. 2a is a plan view.

Referring now to Fig. 2a the pivot axis M—N passes through the position of maximum thickness E at the root section of the lifting surfaces and is swept-back according to the invention at an angle $\alpha$, the angle being so selected that the axis M—N passes between the extreme position C. P. $f$ and C. P. $a$ of the centroid of pressure, whereby the leverage $f'$ and $a'$, respectively thereof are made small, and of equal order of magnitude and opposed sign. The moments about the pivot axis are accordingly small.

Figure 2B:
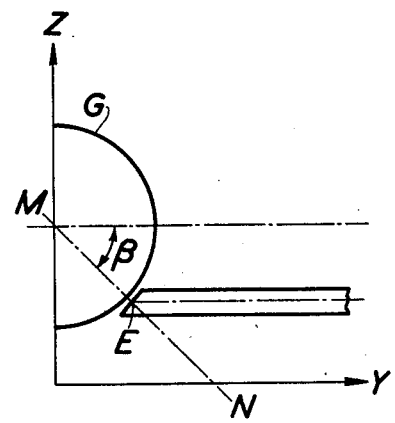
Figs. 2b and 2c are alternative corresponding frontal elevations of a swept-back tailplane pivoted about an axis, swept-back, and having a negative dihedral for a low set tailplane (Fig. 2b) and a positive dihedral for a high set tailplane (Fig. 2c), Figs. 2a, b, c also being purely diagrammatic.
Figure 2C:
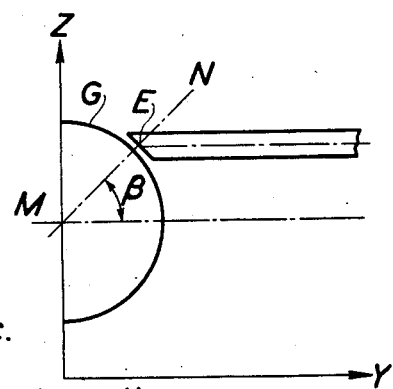

In Fig. 2b it is shown that the pivot axis M—N may have a negative dihedral $\beta$ angle for a low set tailplane or according to Fig. 2c alternatively a positive dihedral for a high set tailplane, and that accordingly a gap between the fuselage G and the leading edge A of the root section in the downwardly tilted position of the latter can be avoided. Owing to the sweep-back of the pivot axis M—N the gap formed at the trailing edge of the root section can also be kept within an acceptable magnitude and is of little significance anyway in comparison with the advantage of avoiding a gap at the leading edge.

The actuation of the lifting surface is obtained by providing an extensible member (not shown), e. g. a screw actuator which connects some point in the root section to a fixed point on the fuselage structure. The extensible member will lie in a plane at right angles to the axis of rotation, and will rotate in that plane about the fixed points about an axis of rotation essentially parallel to the axis of rotation of the surface.

Figure 3:
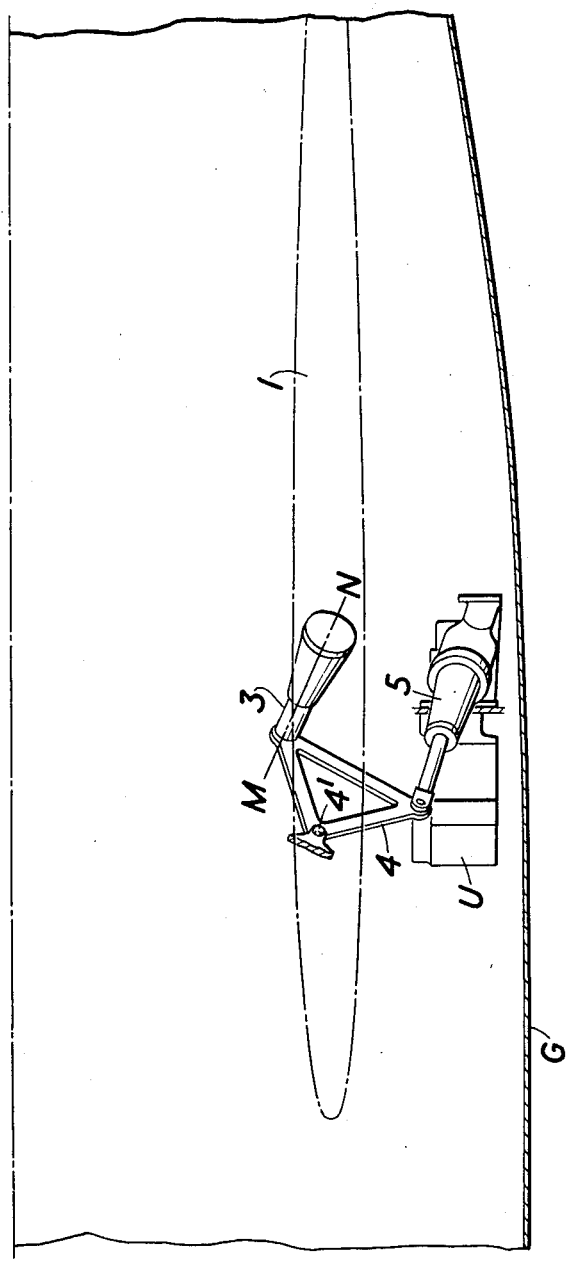
Fig. 3 is a side elevation, partly broken off, of an embodiment of a low set tailplane according to the invention.

Referring now to Figs. 3 to 5, a tailplane 1 is attached to the tapering rear end of an aircraft fuselage G below the centre line thereof. Both the leading edge and the trailing edge of the tailplane 1 have a considerable sweep-back, exceeding 45°. The tailplane 1 is pivoted to the fuselage G about a pivot axis M—N including an angle α with the centre line in plan view (Fig. 4) and having a negative dihedral angle β (Fig. 5). The notations M—N, α and β are the same as in Figs. 2a, b, c.

The tailplane has a single spar 2 (Fig. 4) designed to take bending torque and thrust loads and, arranged at an angle β (Fig. 5) at its inner end, there is a trunnion 3 which is pivoted about the axis M—N in self-aligning radial- and thrust bearings in the fuselage G. On the inner end of the trunnion 3, a lever 4 is mounted, which may have the shape of a triangle with profiled edges.

The corner 4' of the triangular lever 4 may be attached to a point of the root of the tailplane 1, so as to transmit part of the torque directly into the tailplane structure and to receive the spar 2 and its connections to the tailplane structure accordingly. The connection of the lever 4 to the root of the tailplane 1 passes through an aperture in the skin of the fuselage G.

In the plane of rotation of lever 4 about the axis M—N an actuator 5 is arranged, the "fixed" part of which is mounted on the fuselage G, and the "movable" part of which is articulated to the lever 4. This "fixed" part of actuator 5 is rotated about its own axis, and swivels about a pivot axis on the fuselage G, but is restrained from moving bodily with respect to the latter, while the "movable" part performs the extending movement of the jack relative to the fuselage G, and partakes also in any swivelling movement of the "fixed" part, but is restrained from rotating about its own axis.

The "fixed" part of each actuator 5 is geared by bevel gearing 10 to a lay shaft 7 which is co-axial to its pivot axis on the fuselage G. The shaft 7 of the starboard and of the port actuator converge towards, and are geared by a bevel gear 6 to, a common drive unit U arranged on the bottom of the fuselage G in the vertical plane of symmetry thereof.

While I have described and illustrated what may be considered typical and particularly useful embodiments of my said invention I wish it to be understood that I do not limit myself to the exact details and dimensions described and illustrated, for obvious modifications will occur to a person skilled in the art.

What I claim as my invention and desire to secure by Letters Patent is:

1. A lifting surface arrangement for supersonic aircraft, comprising in combination: a lifting surface having a considerable sweep-back of the leading edge and of the trailing edge, a trunnion attached to said lifting surface having a swept-back pivot axis passing in plan view between the extreme centroid of pressure positions encountered at different Mach numbers, altitudes and angles of incidence of the said lifting surface and through the root section of said lifting surface adjacent its maximum airfoil thickness, and control means adjusting the said lifting surface about the said pivot axis.

2. A lifting surface arrangement for supersonic aircraft, comprising in combination: a tapering aircraft structure component, a lifting surface having a considerable sweep-back of the leading edge and of the trailing edge and arranged vertically offset from the horizontal middle plane of the said structure component, a trunnion attached to said lifting surface having a swept-back pivot axis passing in plan view between the extreme centroid of pressure positions encountered at different Mach numbers, altitudes and angles of incidence of the said lifting surface and through the root section of said lifting surface adjacent its maximum airfoil thickness, said pivot axis being inclined at a dihedral angle to the said horizontal plane, bearing means journalling said trunnion in said structure component, and control means adjusting the said lifting surface about the said pivot axis.

3. A lifting surface arrangement for supersonic aircraft, comprising in combination: an aircraft structure component tapering towards the rear, a lifting surface having a considerable sweep-back of the leading edge and of the trailing edge arranged above the horizontal middle plane of the said structure component, a trunnion attached to said lifting surface having a swept-back pivot axis passing in plan view between the extreme centroid of pressure positions encountered at different Mach numbers, altitudes and angles of incidence of the said lifting surface and through the root section of said lifting surface adjacent its maximum airfoil thickness, said pivot axis being inclined at a positive dihedral angle to the said horizontal plane, bearing means journalling said pivot in said structure component, and control means adjusting the said lifting surface about the said pivot axis.

4. A lifting surface arrangement for supersonic aircraft, comprising in combination: an aircraft structure component tapering towards the rear, a lifting surface having a considerable sweep-back of the leading edge and of the trailing edge arranged below the horizontal middle plane of the said structure component, a trunnion attached to said lifting surface having a swept-back pivot axis passing in plan view between the extreme centroid of pressure positions encountered at different Mach numbers, altitudes and angles of incidence of the said lifting surface and through the root section of said lifting surface adjacent its maximum airfoil thickness, said pivot axis being inclined at a negative dihedral angle to the said horizontal plane, bearing means journalling said pivot in said structure component, and control means adjusting the said lifting surface about the said pivot axis.

5. A lifting surface arrangement for supersonic aircraft, comprising in combination: a lifting surface having a considerable sweep-back of the leading edge and of the trailing edge, a single swept-back spar in the said lifting surface adjacent the maximum airfoil thickness, a trunnion arranged at the inner end of said spar having a swept-back pivot axis passing in plan view between the extreme centroid of pressure positions encountered at different Mach numbers, altitudes and angles of incidence of the said lifting surface, self-aligning radial and thrust bearings journalling said trunnion in the said structure component, and control means adjusting the said lifting surface about the said pivot axis.

6. A lifting surface arrangement as claimed in claim 5, wherein the said control means comprise in combination: a lever keyed to the said trunnion, and an actuator having a moving part articulated to said lever and a fixed part articulated to said structure component, the said lever being connected to the said lifting surface adjacent said structure component at a point offset from the said pivot axis.

References Cited in the file of this patent

UNITED STATES PATENTS

| 1,590,880 | Broquist | June 29, 1926 |
| 2,162,066 | De Asis | June 13, 1939 |

FOREIGN PATENTS

| 609,013 | Great Britain | Sept. 23, 1948 |